March 2, 1948.  W. W. RIEBLI  2,437,210
DRAINAGE SYSTEM FOR STABLES
Filed Oct. 18, 1944  2 Sheets-Sheet 1
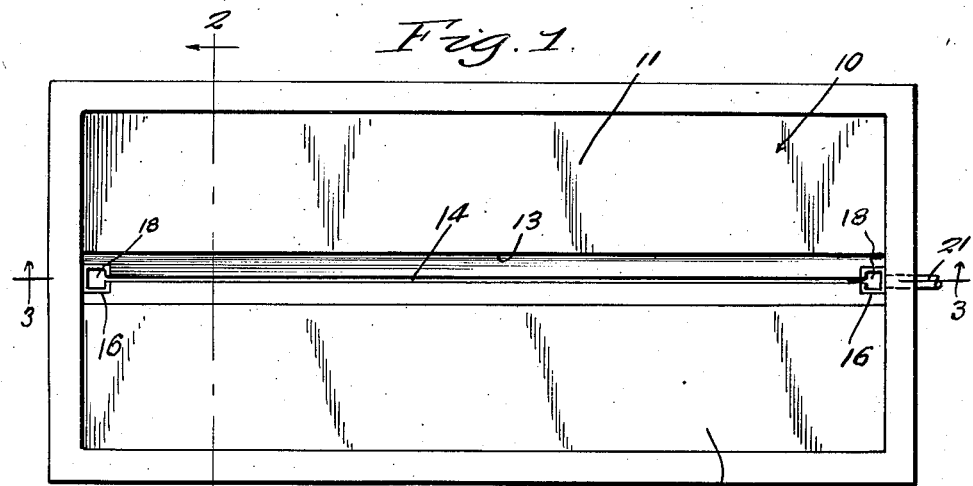
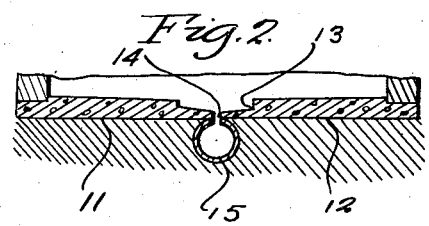
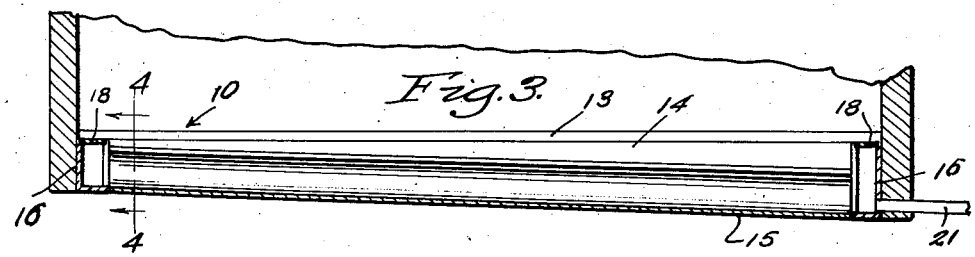
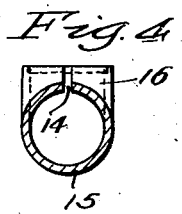
Inventor
Walter W. Riebli
By *Clarence A. O'Brien and Harvey B. Jacobson*
Attorneys March 2, 1948. W. W. RIEBLI 2,437,210
DRAINAGE SYSTEM FOR STABLES
Filed Oct. 18, 1944 2 Sheets-Sheet 2
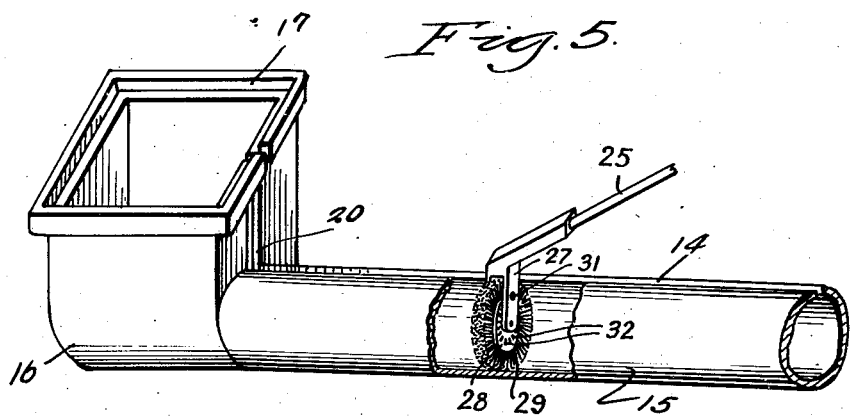
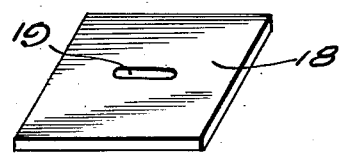
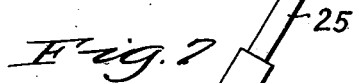
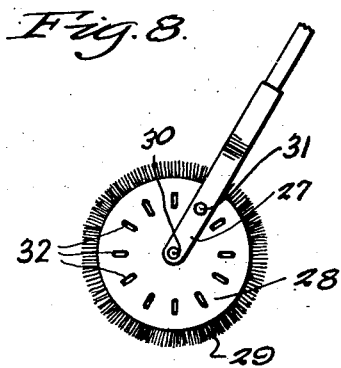
Inventor
Walter W. Riebli
By Clarence A. O'Brien
and Harvey B. Jacobson
Attorneys Patented Mar. 2, 1948

2,437,210

UNITED STATES PATENT OFFICE 2,437,210

DRAINAGE SYSTEM FOR STABLES

Walter W. Riebli, Oakland, Calif.

Application October 18, 1944, Serial No. 559,196

2 Claims. (Cl. 119—28)

1

This invention relates to a drainage system for stables, barns, or the like, and is particularly applicable to such stables or barns adapted for the housing of dairy cattle.

A primary object of the present invention is the provision of an improved drainage system of this character, whereby the necessity for the use of a gutter of varying depth, extending adjacent the rear of the stalls of the animals, is obviated.

An additional object is the provision of such a drainage system provided with an inlet groove or channel which is relatively narrow and of a width insufficient to permit the catching of the hoof of an animal therein.

A still further object is the provision of such a drainage system, provided with a storage receptacle for liquid manure, from which the same may be readily removed for utilization as fertilizer.

Still another object is the provision of an improved drainage system for stables, or the like, so designed as to reduce the possibility of clogging the same to a minimum.

A still further object is the provision of such a drainage system which will improve the sanitary condition in a barn or stable, or the like, wherein cows are milked, thus reducing the possibility of contamination of the milk.

Other objects reside in the combinations of elements, arrangements of parts, and features of construction, all as will be more fully pointed out hereinafter and shown in the accompanying drawings, wherein there is disclosed a preferred embodiment of this inventive concept.

In the drawings:

Figure 1 is a top plan view of a drainage system embodying this inventive concept, as applied to a barn or stable, or the like, the position of certain elements being indicated by dotted lines.

Figure 2 is a sectional view taken substantially along the line 2—2 of Figure 1, and viewed in the direction indicated by the arrows.

Figure 3 is a sectional view taken substantially along the line 3—3 of Figure 1, and viewed in the direction indicated by the arrows.

Figure 4 is a sectional view taken substantially along the line 4—4 of Figure 3, as viewed in the direction indicated by the arrows.

Figure 5 is a perspective view of certain constructional details showing the brush in the drain pipe with its handle extending through the slot in said pipe.

Figure 6 is a perspective view of an additional constructional detail.

2

Figure 7 is a sectional view of a brush adapted for utilization in conjunction with the system, and Figure 8 is a plan view of the brush as shown in Figure 7.

Like reference numerals refer to like parts throughout the several views of the drawings.

Having reference now to the drawings, and more particularly to Figure 1, there is generally indicated at 10 a floor of a stable or barn, or the like, comprised of two oppositely disposed bases 11 and 12 adapted to form the floor of the stalls for cattle or the like. As best shown in Figure 2, the portions 11 and 12 are inclined toward a centrally positioned gutter or channel 13 in the center of which is a slot 14 communicating with a pipe 15 positioned beneath the floor 10. As best shown in Figure 3, the pipe 15 is positioned at an incline and extends from one end of the floor 10 to the other. Positioned at both ends of pipe 15 are receptacles 16 adapted to permit the insertion of a broom into the pipe 15. As best shown in Figure 5, each of receptacles 16 is provided with an interior flange 17 upon which is adapted to rest a cover member 18 (see Fig. 6), provided with a hand grip 19. As shown in Figure 5, the slot 14 extends upwardly, as at 20, through the adjacent end walls of receptacles 16. A pipe or conduit 21 leads from the receptacle 16 at the lower end of the pipe 15 to any suitable exterior source of storage for liquid manure.

A suitable brush or broom, so designed as to be readily passed through slot 14, is provided for cleaning out the interior of pipe 15 and receptacles 16. As best shown in Figures 7 and 8, the brush comprises a handle portion 25 bent at an angle, as at 26, to permit ready insertion thereof into the slot 14 and bifurcated at its lower extremity, as at 27. A rotatable brush comprised of side plates 28 and circularly disposed bristles 29 is rotatably mounted, as on a pin 30, extending through suitable apertures in the bifurcations 27. A locking pin 31 will be inserted through the handle portion 27 and through the aligned openings 32 in the side plates 28 for holding the brush in the desired position.

From the foregoing it will now be seen that there is herein provided an improved drainage system for stables or the like, which effectively carries off all liquid drainage from the barn through a substantially enclosed channel, and drains the same into closed receptacles. It will also be seen that there is herein provided a device which improves the sanitary characteristics of a stable or barn, or the like, and which may be readily and efficiently cleaned when desired, which accomplishes all the objects of the invention and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

1. In a drainage system for stables, oppositely disposed floor sections having inclined converging surfaces terminating short of each other to form a longitudinally extending drain slot, an inclined drain pipe disposed below said floor sections formed with a longitudinally extending slot disposed below and registering with said drain slot formed by the adjacent edges of said floor sections, and a receptacle formed with a vertically extending slot connecting with the longitudinally extending slot in said drain pipe whereby a cleaning device may be inserted in said receptacle and drawn through said pipe to clean the same.

2. In a drainage system for stables, oppositely disposed floor sections having inclined converging surfaces terminating short of each other to form a longitudinally extending drain slot, an inclined drain pipe disposed below said floor sections formed with a longitudinally extending slot disposed below and registering with said drain slot formed by the adjacent edges of said floor sections, receptables formed with vertically extending slots positioned at the opposite ends of said pipe and connecting with the longitudinally extending slots in said drain pipe whereby a cleaning device may be inserted in said receptacles and drawn through said pipe to clean the same, and closures for said receptacles.

WALTER W. RIEBLI.

REFERENCES CITED

The following references are of record in the file of this patent:

UNITED STATES PATENTS

| Number | Name | Date |
|---|---|---|
| 458,788 | Jungbluth | Sept. 1, 1891 |
| 801,193 | Adriance | Oct. 10, 1905 |
| 630,533 | Fiske | Aug. 8, 1899 |
| 505,232 | Schiffer | Sept. 19, 1893 |
| 502,004 | Logan | July 25, 1893 |